Patented Apr. 13, 1954

2,674,743

UNITED STATES PATENT OFFICE 2,674,743

THERAPEUTIC, COSMETIC, AND CORRECTIVE DEVICE

Romey A. Gaiser and George B. Watkins, Toledo, Ohio

No Drawing. Application September 21, 1950, Serial No. 186,108

7 Claims. (Cl. 3—13)

The present invention relates to therapeutic, cosmetic and/or corrective devices to be worn in contact with human tissues. More particularly, it has to do with improved devices of this character that are made up of a body portion of one material and a coating or sheath of another material which covers or encloses the body portion.

Briefly stated, our invention is based on the discovery, first, that the materials best suited for corrective devices that are to be worn in the eyes, ears, and other body cavities are irritating to the tissues in and around these cavities, second, that silica is practically non-irritating to human tissues and, third, that silica or quartz can be readily and tightly adhered to the first-mentioned materials to provide a complete and non-irritating covering or sheath.

There are a great many people who find it necessary to wear artificial eyes, and in many cases the wearing of these eyes has caused severe irritation and presented some very annoying problems. There are other persons who, for cosmetic, athletic or other reasons, wear so-called contact lenses, instead of regular eye glasses or spectacles, and these lenses create problems that, although less serious than those encountered with artificial eyes, are similar in character. Certain types of fittings worn in the ears as parts of hearing aids, or as filters in the nose, are still other, although less severe, sources of tissue irritation.

In the past, eye implants, which are used to fill the eye sockets of individuals who have had an eye removed, and the artificial eyes that cover these implants, were usually made of glass. However, such glass devices were too heavy; they were often difficult to fabricate; and they were subject to breakage, either spontaneous or otherwise, with disastrous results. In addition, they appeared to have an irritating effect on the tissues, as evidenced by the tendency of glass eyes to water. Such irritation may have resulted from the facts that the lacyrmal fluid has a hydrogen ion concentration that is slightly on the alkaline side, and that glass is attacked, etched and even slowly dissolved by alkaline fluids. Obviously irritation would arise from roughness produced on the artificial eye by the action of the tears, or from a solution of the glass constituents in the tear fluid.

Since that time, and with the advent into common use of light, unbreakable plastics, glass eyes have been superseded by these more practicable materials and, today, virtually all of the artificial objects used in the eye are constructed of resinous materials in the form of acrylic esters or polymers of styrenes or substituted styrenes. In other corrective devices, such as hearing aids, numerous resins or combinations of resins have been used.

These therapeutic, cosmetic or corrective devices when made of plastic have a great many advantages. In addition to being light in weight and practically unbreakable, they can be readily cast, molded or shaped into any desired form, they are relatively inexpensive, and they can be colored or pigmented in a number of different ways to closely imitate, or exactly match the color and texture of the wearer's skin or eyes.

Unfortunately, however, they have a very serious drawback; and that is that approximately 25% of the people who wear such devices cannot tolerate plastic or resinous substances, particularly in contact with secreting types of tissues, such as are present in the human eye socket for example.

These 25% of the potential wearers of such corrective devices appear to be allergic or extremely sensitive to the resins of which the devices are made and have various unpleasant reactions which may take the form of excess secretions, pressures building up behind the object, skin eruptions, and other manifestations of irritation. In fact, among these 25% the actual irritation, and the embarrassment resulting from it, are often so severe and unbearable as to force the unfortunate wearer to discard the device completely.

For example, users of artificial eye implants of plastic have experienced actual loss of the implant due to pressure, resulting from tissue irritation, being built up behind and causing the implant to literally pop out of the eye socket. Where the eye muscles have been anchored to the implant this sort of experience combines the physical pain of torn muscles with acute mental anguish. Along this same line it is not uncommon to have wearers of artificial hearing aids experience disturbingly severe skin eruptions from the plastic of which the object inserted into the ear canal is made.

Another difficulty that is encountered with artificial eyes, and contact lenses made of plastics, arises from the fact that they are not readily wet by tears. This is because these plastics normally present a non-wettable surface, and such an abnormal surface condition in an object in the eye socket will set up some additional disturbances in the eye tissues, and may in itself create irritations, that are distinctly apart and different from the allergic reactions previously discussed.

Furthermore, the artificial eye or contact lens of plastic is usually inserted into the eye in a sodium bicarbonate, methyl cellulose, or other solution. This solution does not last indefinitely, possibly being drained off through the lacyrmal ducts, and eventually irritations that are set up may be the cause of solution clouding, necessitating removal of the part and reinsertion with additional uncontaminated fluid.

Now it is a primary aim of this invention to eliminate the disadvantages of presently used corrective devices made of plastic that are worn in contact with human tissues while, at the same time, retaining all of the good qualities of these known devices.

Another object is the provision of complete, improved, therapeutic, cosmetic or corrective devices to be worn in this manner, by first forming the devices from light weight, non-breakable, easily worked material, and then covering them with a coating or sheath of a specially applied non-irritating material.

Another object is to provide a corrective device for use in the eye that is light, non-frangible and has a readily wettable, scratch-resisting, surface.

Another object is the provision of a device of the above character which is made up of a body portion of plastic and a coating of silica on said body portion.

Still another object is to provide, in a device of the above character, a body portion of plastic and a hard, clear, transparent and substantially colorless coating, having an index of refraction that is substantially the same as the surface of the body portion, on said body portion.

Other objects and advantages of the invention will become more apparent during the course of the following description.

By means of the present invention, we are not only able to produce corrective devices to be worn in contact with human tissues which are light in weight, unbreakable, scratch resistant, readily wettable and non-irritating, but we can also treat existing devices made of plastic in a manner to render them non-irritating to the tissues which they are adapted to contact.

In either case the procedure of the invention involves covering a corrective device that has been formed of one material, with a coating or sheath of another material, and preferably with quartz or silica.

Through the use of such silica or quartz coatings on eye implants, artificial eyes, contact lenses, hearing aid devices and so forth made of plastic, we have been able, in actual practice, to reduce the allergic conditions and irritations to the wearers of the devices to a bare minimum. As a matter of fact, we have yet to hear of a case where the silica coated plastic object has had any irritating effect on the wearer; and this in spite of the fact that experiments have been conducted on people using implants and eyes of plastic, who had been experiencing severe allergic reactions. In every case, after we coated the plastic of the eye part with silica, all trace of irritation disappeared.

In addition to overcoming the cause of the allergy conditions and attending irritations, the silica coating, which completely covers and is tightly adherent to the object made of plastic, immediately makes the object, or more precisely, its silica coating, completely wettable by the tears of the eye, or other bodily fluids. This creation of a condition that is practically identical with the normal bodily condition still further reduces the possibility of irritation from the foreign corrective body.

In producing a therapeutic, cosmetic or corrective device according to this invention, the device is first cast, molded, pigmented, colored and/or otherwise treated to give the shape and appearance desired in the finished article. One of the primary advantages of the invention is that any desired material can be used in this first step. Consequently, the material offering the best characteristics of workability, non-fragibility, weight, appearance and economy can be chosen, without regard for its suitability as a material to be worn in contact with human tissue.

Generally speaking, we have found that plastics, and particularly resin plastics best adapt themselves to this purpose. As indicated above, many plastics and combinations of plastics have been successfully used in forming corrective devices of this character. However, for reasons that will be more clearly hereinafter apparent, we prefer to use polymers of styrenes or substituted styrenes, although the esters of acrylic and methacrylic acids, such as polymethyl methacrylate, have also been successfully used; and even the cellulosic plastics will be suitable as a base material for the devices of the invention.

Once an object made of plastic of the proper shape and appearance to be used has been provided, the next step is to completely enclose it in a covering or sheath of silica so that, regardless of the material from which the base or body portion of the device is made, only the silica coating will be in position to contact flesh or tissue and the finished article will be non-irritating when worn as intended.

To do this in accordance with the invention, the object is first carefully and thoroughly cleaned, preferably by washing in a detergent solution. Stains or other foreign material which are not removed by the detergent solution may be removed by a careful cleaning with methyl alcohol. The cleaned object is then rinsed with distilled water, after which it is dried with a stream of filtered air.

Following the cleaning step, the object or body of plastic is immediately inserted into a conventional vacuum chamber which has been previously prepared with a tungsten filament and a high-voltage glow discharge electrode. Inside the tungsten filament or spiral is placed a thin filament or cane of fused silica or quartz. The quartz may be coated with a very thin film of oxidized aluminum to serve as a flux, or a small quantity of aluminum oxide may be placed on the quartz rod, or the rod may be pure quartz or silica with no additional agent thereon. An open dish of phosphorous pentoxide is placed on the base plate of the vacuum chamber and the bell jar is closed on the base plate. The roughing pump is then started to effect a vacuum within the chamber.

The phosphorous pentoxide will act as a water absorber and will remove traces of residual moisture from the vacuum chamber. In a liter of gas dried at 25° C. over phosphorous pentoxide, less than $2 \times 10^{-5}$ milligrams of water will remain. Removal of the water is important as it has a tendency to oxidize the tungsten filament resulting in thermal evaporation within the vacuum chamber, of tungsten oxide which of course would leave the plastic objects with a dark coloration. If a bare silica filament or rod is placed within the tungsten filament the heat required to evaporate will be considerably higher than is the case when the quartz fiber is coated with either aluminum or aluminum oxide. The aluminum oxide on the silica does not evaporate and remains on the residual silica left in the filament or upon the tungsten itself. It merely acts as a flux to cause evaporation of the silica to take place at lower temperatures.

The roughing pump will evacuate the chamber to approximately $10^{-1}$ mm. mercury pressure. When this point is reached, a glow discharge is started within the chamber. The glow discharge is obtained by means of an X-ray transformer, neon sign transformer, or other high-voltage transformer source whereby one terminal of the secondary is connected to an electrode within a chamber, and the other terminal of the transformer is connected to the base plate of the vacuum system. The purpose of the glow discharge is to clean up the system and the surfaces of the plastic object in order to secure improved adhesion of the silica or quartz to the objects to be coated. The glow discharge is continued from the time the fore pump secures a vacuum of $10^{-1}$ mm. pressure of mercury within the system until a pressure approximating $10^{-3}$ mm. of mercury is obtained at which time there are insufficient gas molecules present to maintain the glow discharge.

The increased vacuum is obtained from an oil diffusion pump which is placed in operation after the fore pump has secured a pressure of $10^{-1}$ mm. of mercury. When a pressure within the system of $10^{-4}$ to $10^{-5}$ mm. of mercury is obtained, the tungsten filament is then heated to effect an evaporation of the quartz or silica fiber. The amount of quartz evaporated is of course, dependent upon the distance from the tungsten filament to the object to be coated.

The thickness of the quartz is determined by calculation, with the supposition that all the quartz is being thrown on a spherical surface whose radius is the distance from the tungsten filament to the object to be coated. The time of evaporation is a fraction of one minute, depending on prior surface preparation of the quartz rod. After evaporation of the quartz has been completed, the vacuum is broken and the plastic object is removed and is then ready for use.

As an alternative to evaporating fused silica or quartz, silicon monoxide may be substituted for quartz or silica and later oxidized.

As indicated above, we have found that polystyrene is the best all around material to use as the body portion of the corrective devices of this invention. One important reason for this is the affinity which exists between silica and polystyrene. Our work has shown that this affinity is so great that thermal evaporation of quartz from a single filament will completely coat a polystyrene object of any desired shape.

Now this is quite surprising because with most substances being thermally distilled in high vacuum apparatus, the material will travel in straight lines through the vacuum and will deposit on the surface of objects presented to the filament. In fact, this straight line distillation effect is so pronounced that for practically all substances being evaporated, shadows will be cast.

With polystyrene, however, as the receiving object and with silica or quartz as the distilled material, no shadows will be cast, and the quartz or silica will creep around the entire polystyrene object, completely and uniformly covering it with a film or sheath of silica that is so tenaciously held by the plastic as to be to all intents and purposes an integral part of it.

Although this phenomenon is more noticeable with silica and polystyrene plastics, the affinity of silica and other plastics is adequate and has proved to be sufficient to make them completely practicable for our purpose.

Quartz or silica, in addition to being non-irritating to human tissues, also have other properties which make them especially desirable for our purpose. Thus, they have a refractive index which closely approximates the refractive index of the resins which are most commonly used in corrective devices. In fact, the approximation is so close that practically no interference colors are shown when quarter wave length films of silica are placed on these plastics. This is because the interference colors are so weak as to be barely perceptible and, consequently, thin films of silica in the order of a few quarter wave lengths can be used in accordance with the invention to provide a sheath or covering, between the body portion of the corrective device and the tissue of the wearer, with no noticeable change in color or increase in the reflection of light from the surface of the object.

In other words, the silica coatings of this invention are practically unnoticeable, and so are entirely satisfactory both from an optical and therapeutic point of view, because they can only be detected by the wettability of the object and the reduced tissue irritation.

Another advantage of our coated corrective devices lies in the improvement of the scratch resistance of their surfaces. This is important because, with time, the surfaces of artificial eyes and contact lenses become scratched and marred through cleaning operations. In the case of the contact lenses this blurs visual images and, in the case of the artificial eyes, the scratches accumulate to a point where they are both unnatural and unsightly. For this reason the silica coated eyes and lenses made of plastic have a much longer effective life.

We have also successfully coated eye implants with such inactive metals as tantalum, platinum, gold and rodium, all of which show considerable promise in reducing irritations to body tissues. To date, the silica coated plastics have given best results, but it is to be understood that the forms of the invention herewith described are to be taken as illustrative embodiments only of the same, and that various changes in the shape, size and arrangement of parts, as well as various procedural changes may be resorted to without departing from the spirit of the invention or the scope of the subjoined claims.

We claim:

1. In an artificial eye a member shaped to fit into the eye socket and to be worn in contact with the tissue therein, said member comprising a body portion of a plastic, and a readily wettable coating of an inactive mineral that is not irritating to said tissue on said body portion.

2. A corrective device to be worn in contact with human tissue comprising a base portion shaped to fit a portion of the human body, and a coating of silica on said base portion.

3. A corrective device comprising a body portion of plastic conforming in shape to a depression in the human body, and a sheath of silica in surrounding relation and tightly adherent to said body portion.

4. A corrective device of the character described comprising a body portion of polystyrene, and a coating of silica on said body portion.

5. As a new article of manufacture, an implant for an artificial eye comprising a body portion of plastic shaped to fit into the socket of a human eye, and a coating of silica completely covering said body portion.

6. An artificial eye comprising a body portion shaped to fit into an eye socket and to cooperate with an eye implant, and a coating of silica on said body portion.

7. A contact lens comprising a transparent plastic lens shaped to give a predetermined optical correction, and a clear transparent and substantially colorless coating of silica on the surface of said lens.

References Cited in the file of this patent

UNITED STATES PATENTS

| Number | Name | Date |
|---|---|---|
| 1,472,245 | Daly | Oct. 20, 1923 |
| 2,447,011 | Bechtold | May 4, 1948 |
| 2,517,523 | Batchelder | Aug. 1, 1950 |
| 2,540,623 | Law | Feb. 6, 1951 |